US008840333B2

(12) United States Patent
Massey (10) Patent No.: US 8,840,333 B2
(45) Date of Patent: Sep. 23, 2014

(54) FRAME JOINT CONNECTOR

(71) Applicant: Milgard Manufacturing Incorporated, Taylor, MI (US)

(72) Inventor: Victor Massey, Orting, WA (US)

(73) Assignee: Milgard Manufacturing Incorporated, Tacoma, WA (US)

( * ) Notice: Subject to any disclaimer, the term of this patent is extended or adjusted under 35 U.S.C. 154(b) by 0 days.

(21) Appl. No.: 13/724,188

(22) Filed: Dec. 21, 2012

(65) Prior Publication Data
US 2014/0174020 A1    Jun. 26, 2014

(51) Int. Cl.
*A47G 1/10*    (2006.01)

(52) U.S. Cl.
USPC ........... 403/231; 403/401; 403/402; 403/381; 403/293; 403/298; 40/782; 40/783; 40/785; 58/210

(58) Field of Classification Search
USPC .............. 52/582.1–585.1, 210; 403/298, 231, 403/401–403, 205, 292–295, 409.1, 403/381–382; 40/782–785
See application file for complete search history.

(56) References Cited

U.S. PATENT DOCUMENTS

| | | | |
|---|---|---|---|
| 497,915 A * | 5/1893 | Fulghum et al. | 403/294 |
| 1,695,553 A * | 12/1928 | Jones et al. | 52/281 |
| 2,861,659 A | 11/1958 | Hagerty et al. | |
| 2,989,788 A | 6/1961 | Milton | |
| 3,333,689 A * | 8/1967 | Terrill et al. | 401/76 |
| 3,425,721 A * | 2/1969 | Agee | 403/294 |
| 3,603,053 A * | 9/1971 | Van Loghem et al. | 52/285.1 |
| 3,606,419 A | 9/1971 | Virkler et al. | |
| 3,782,054 A | 1/1974 | Goss | |
| 4,434,594 A | 3/1984 | Bliss | |
| 4,453,855 A | 6/1984 | Richter et al. | |
| 4,493,583 A * | 1/1985 | Wallace | 403/402 |
| 4,651,482 A | 3/1987 | Borys | |
| 5,090,835 A * | 2/1992 | Cox | 403/294 |
| 5,109,645 A | 5/1992 | Bucci | |
| 5,297,891 A | 3/1994 | Rosa | |
| 5,603,585 A | 2/1997 | Bruchu et al. | |
| 5,921,037 A | 7/1999 | Minter | |
| 5,927,039 A | 7/1999 | De Boer | |
| 6,186,691 B1 * | 2/2001 | Rudolf-Bauer | 403/31 |
| 6,189,282 B1 * | 2/2001 | VanderWerf | 52/582.1 |
| 6,746,175 B1 | 6/2004 | Gonnerman et al. | |
| 6,851,244 B2 | 2/2005 | Vilhauer | |
| 6,874,291 B1 * | 4/2005 | Weber | 52/586.1 |
| 7,152,383 B1 * | 12/2006 | Wilkinson et al. | 52/581 |
| 7,634,880 B2 | 12/2009 | Sironko et al. | |
| 7,698,871 B2 | 4/2010 | Mansueto et al. | |
| 7,748,194 B2 | 7/2010 | Carless | |
| 7,784,239 B2 | 8/2010 | Mansueto et al. | |
| 7,845,139 B1 | 12/2010 | Mansueto et al. | |
| 8,147,162 B1 * | 4/2012 | Burnett et al. | 403/292 |
| 2001/0014250 A1 | 8/2001 | Plummer et al. | |
| 2002/0170259 A1 * | 11/2002 | Ferris | 52/596 |

FOREIGN PATENT DOCUMENTS

BE    892702 A  *  9/1982
BE    893702 A  * 10/1982

* cited by examiner

*Primary Examiner* — Jeanette Chapman
(74) *Attorney, Agent, or Firm* — Rathe Lindenbaum LLP (57) ABSTRACT

A frame the joint connector comprises a first head, a second head and a neck interconnecting the first head and the second head. The first head forms a first shoulder adjacent the neck facing the second head. The second head forms a second shoulder adjacent the neck facing the first head.

13 Claims, 6 Drawing Sheets

FRAME JOINT CONNECTOR

BACKGROUND

Windows and doors are often surrounded by a frame formed from assembled lineals. Assembling the lineals to form the frame can be tedious and time-consuming, often requiring factory assembly or specialized tools for field assembly. Existing frames frequently require lineals with solid filled profiles, increasing the cost and weight of the frame. Such lineals are often connected using angled screws that are screwed into the solid profiles of the lineals. With such screws, it is difficult to adequately tighten the joint between the assembled lineals. Variations in lineal alignment and screw positioning often leads to inconsistent results and splitting of the lineals.

DETAILED DESCRIPTION OF THE EXAMPLE EMBODIMENTS

Figure 1:
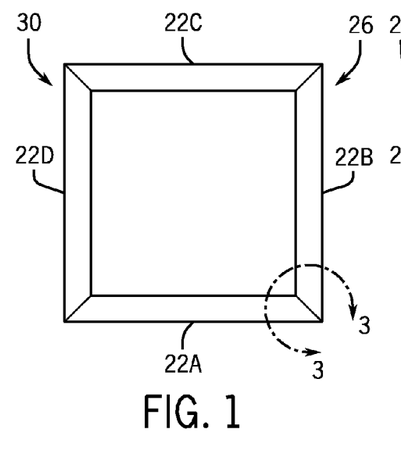
FIG. 1 is a front view of an example frame assembled using an example lineal connection system.
Figure 2:
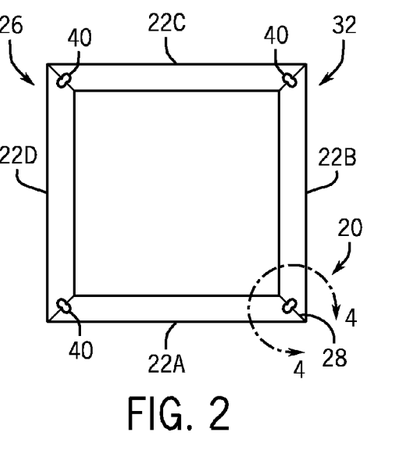
FIG. 2 is a rear view of the frame of FIG. 1.
Figure 3:
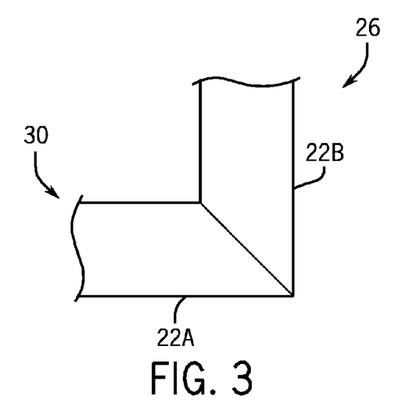
FIG. 3 is an enlarged fragmentary front view of the frame of FIG. 1.
Figure 4:
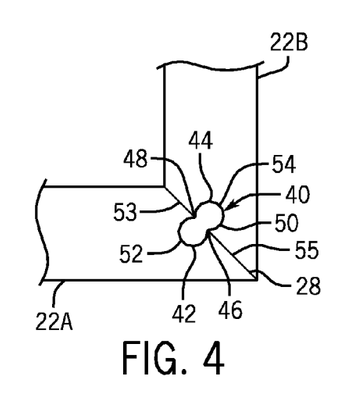
FIG. 4 is an enlarged fragmentary rear view of the frame of FIG. 1.

FIGS. 1-4 illustrate an example lineal connection system 20. FIGS. 1 and 2 illustrate connection system 20 joining a pair of adjacent frame members or lineals 22 to form a frame 26. FIGS. 3 and 4 are enlarged views of a corner portion of frame 26 taken along lines 3-3 and 4-4 of FIGS. 1 and 2, respectively. As will be described hereafter, connection system 20 provides a universal joint connection and tightening system that may be used to tighten multiple joint styles, such as butt, scarf, lap, rabbet and miter joints. At the same time, system 20 achieves such joint connections without requiring multiple fixtures, without substantially exposed fasteners, and without precise lineal alignment and fastener positioning demands. As a result, system 20 facilitates a more reliable and simplified connection of joints.

FIGS. 1 and 2 illustrate connection system 20 joining lineals 22 as part of a miter joint 28. FIGS. 1 and 3 illustrate a front face 30 of frame 26 while FIGS. 2 and 4 illustrate a rear face of the frame 26. As shown by FIGS. 1 and 2, lineal connection system 20 is substantially not visible along the front face 30 of frame 26, being only visible along a rear face 32 of frame 26.

As shown by FIG. 2, connection system 20 joins four lineals 22A, 22B, 22C and 22D (collectively referred to as lineals 22) to form a generally square or rectangular frame. In other implementations, connection system 20 may be used to join other numbers of lineals to form other shaped frames. Connection system 20 comprises at least one joint connector 40 on each joint of the frame sections or lineals 22. As shown by FIG. 4, each joint connector 40 comprises a first head 42, a second head 44 and a neck 46 interconnecting heads 42 and 44. Head 42 forms a shoulder 48 adjacent to neck 46 and facing head 44. At the same time, head 44 forms a second shoulder 50 adjacent to neck 46 facing head 42. In the example illustrated, heads 42 and 40 are cylindrical in shape.

As further shown by FIG. 2, lineals 22 include openings that receive joint connectors 40 such that joint connectors 40 connect and retain lineal 22 relative to one another long joints 28. In particular, lineal 22A comprises a head cavity 52 extending from the rear face 32 towards the front face 30 along an end of lineal 22A adjacent the to be formed joint 28. In the example illustrated, head cavity 52 has a shape corresponding to the shape of head 42, wherein head cavity 52 opens to form a neck opening along edge 53 of lineal 22A for the reception of neck 46 of joint connector 40. Similar to lineal 22A, lineal 22B comprises a head cavity 54 extending from the rear face 32 towards the front face 30 along an end of lineal 22B adjacent the to be formed joint 28. In the example illustrated, head cavity 54 has a shape corresponding to the shape of head 42, wherein head cavity 54 opens to form a neck opening along edge 55 of lineal 22B for the reception of neck 46 of joint connector 40.

In the example illustrated, head cavities 52, 54 are each cylindrical, corresponding in shape to heads 42 and 44, respectively. Because heads 42 and 44 are cylindrical, head cavities 52 and 54 may also be cylindrical, lending their formation through the use of a drill. In particular, head cavity 52, 54 may be formed by drilling two holes, one on each of lineal 22, wherein the holes forming cavity 52, 54 are located in precise locations such at the edge of the drill bit removes part of the hole edge to provide clearance for neck 48. In other implementations, the cylindrical shape of cavities 52 may alternatively be formed in other fashions, such as through other material removing techniques or through the use of molding (such as when lineals 22 are formed from a moldable material).

Because joint connector 40 is symmetrical, heads 42 and 44 having identical shapes and sizes while being mirrored with respect to neck 48, joint connector 40 may be rotated 180 degrees while still being insertable into cavity 52, 54. In other implementations, heads 42 and 44 may have different shapes, wherein cavities 52 and 34 also have different corresponding shapes. In other implementations, heads 42 and 44 as well as head cavities 52 and 34 may have non-cylindrical shapes.

To assemble frame 26, edges 53 and 55 are positioned adjacent to one another to form joint 28. Joint connector 40 is then inserted into the adjacent head cavities 52 and 54. In particular, head 42 is inserted into cavity 52 while head 44 is inserted into cavity 54. The neck 46 interconnecting heads 42 and 44 extends through the adjacent neck openings of cavities 52 and 54. Because heads 42 and 44, and in particular shoulders 48, 50, are spaced from one another by a distance equal to or slightly less than the spacing of the interior edges of their corresponding cavities 52 and 54, joint connector 40 automatically tightens or clamps joint 28. The degree of clamping may be varied by varying the relative positioning of cavities 52, 54 to vary the spacing of those interior surfaces of cavities 52, 54 that face in opposite directions and which contact shoulders 48, 50. Such tightening is achieved without the use of tools and allows joint frame 26 to be assembled by hand or with a hammer. In addition to providing a clamping force, the interaction of shoulders 48, 50 with the interior edges of cavities 52 and 54 also provides an alignment function. As a result, lineal 22 are more consistently and reliably aligned in position with respect to one another.

In addition to enhancing both alignment and clamping of lineal 22, joint connectors 40 may be used to eliminate the use of screws from the assembly of frame 26. As a result, joint connectors 40 reduce the likelihood of damage to lineal that might otherwise occur through the use of screws. In contrast to screws, joint connectors 40 may be formed from materials that are less susceptible to rusting. Unlike screws, joint connectors 40 offer intuitive use and facilitate proper alignment of lineal 22, largely preventing any incorrect operator assembly of frame 26.

Figure 5:
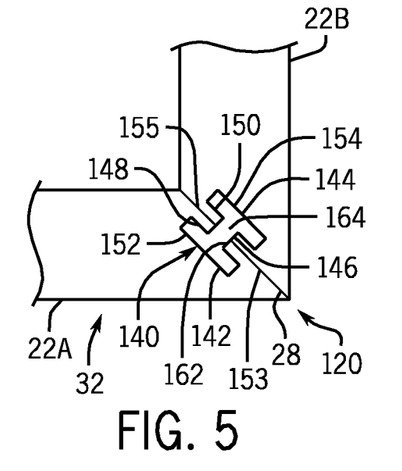
FIG. 5 is an enlarged fragmentary rear view of another example frame assembled using another example lineal connection system.

FIG. 5 illustrates frame 126, another implementation of frame 26. FIG. 5 illustrates a rear face 32 of frame 126, wherein the front face 30 of frame 126 is identical to the front face 30 of frame 26 shown in FIGS. 1 and 3. Frame 126 is similar to frame 26 except that frame 126 utilizes lineal connection system 120 to join lineals 22. Lineal connection system 120 is similar to lineal connection system 20 except that lineal connection system 120 utilizes joint connectors 140 in lieu of the joint connectors 40 and has correspondingly shaped cavities in lineals 22. As shown by FIG. 5, each joint connector 140 comprises a first head 142, a second head 144 and a neck 146 interconnecting heads 142 and 144. Head 142 forms a shoulder 148 adjacent to neck 146 and facing head 144. At the same time, head 144 forms a second shoulder 150 adjacent to neck 146 facing head 142. In the example illustrated, heads 142 and 140 are square or rectangular in shape.

As further shown by FIG. 5, lineals 22 include openings that receive joint connectors 140 such that joint connectors 140 connect and retain lineals 22 relative to one another along joints 28. In particular, lineal 22A comprises a head cavity 152 extending from the rear face 32 towards the front face 30 along an end of lineal 22A adjacent the to be formed joint 28. In the example illustrated, head cavity 152 has a shape corresponding to the shape of head 42, wherein head cavity 152 opens to form a neck opening 160 to edge 153 of lineal 22A for the reception of neck 146 of joint connector 140. Similar to lineal 22A, lineal 22B comprises a head cavity 154 extending from the rear face 32 towards the front face 30 along an end of lineal 22B adjacent the to be formed joint 28. In the example illustrated, head cavity 154 has a shape corresponding to the shape of head 142, wherein head cavity 154 opens to form a neck opening 164 to edge 155 of lineal 22B for the reception of neck 146 of joint connector 140. In the example illustrated, head cavities 152, 154 are each polygonal, comprising a square or rectangle in the illustrated examples, corresponding in shape to heads 142 and 144, respectively.

As with system 20, with system 120, edges 153 and 155 are positioned adjacent to one another to form joint 28. Joint connector 140 is then inserted into the adjacent head cavities 152 and 154. In particular, head 142 is inserted into cavity 152 while head 144 is inserted into cavity 154. The neck 146 interconnecting heads 142 and 144 extends through the adjacent neck openings 162, 164 of cavities 152 and 154, respectively. Because heads 142 and 144, and in particular shoulders 148, 150, are spaced from one another by a distance equal to or slightly less than the spacing of the interior edges of their corresponding cavities 152 and 154, joint connector 140 automatically tightens or clamps joint 28. The degree of clamping may be varied by varying the relative positioning of cavities 152, 154 to vary the spacing of those interior surfaces of cavities 152, 154 that face in opposite directions and which contact shoulders 148, 150. Such tightening is achieved without the use of tools and allows joint frame 26 to be assembled by hand or with a hammer. In addition to providing a clamping force, the interaction of shoulders 148, 150 with the interior edges of cavities 152 and 154 also provides an alignment function. As a result, lineals 22 are more consistently and reliably aligned in position with respect to one another.

Figure 6:
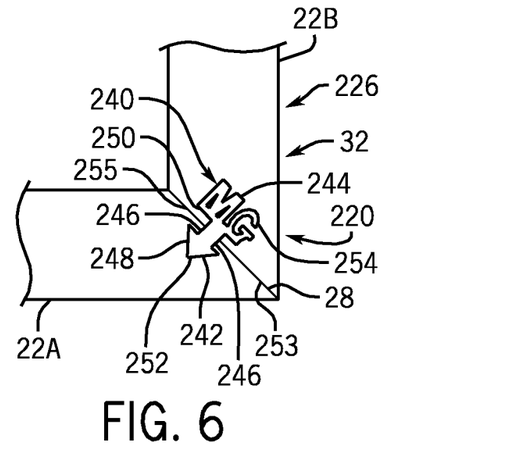
FIG. 6 is an enlarged fragmentary rear view of another example frame assembled using another example lineal connection system.

FIG. 6 illustrates frame 226, another implementation of frame 26. FIG. 6 illustrates a rear face 32 of frame 226, wherein the front face 30 of frame 226 is identical to the front face 30 of frame 26 shown in FIGS. 1 and 3. Frame 226 is similar to frame 226 except that frame 226 utilizes lineal connection system 220 to join lineals 22. Lineal connection system 220 is similar to lineal connection system 20 except that lineal connection system 220 utilizes joint connectors 240 in lieu of the joint connectors 40 and has correspondingly shaped cavities in lineals 22. Unlike joint connectors 40 and 140, joint connectors 240 have asymmetrical shapes. In the example illustrated, joint connector 240 has a first shape received within a correspondingly shaped cavity in lineal 22A and a second distinct shape received within a correspondingly shaped cavity in lineal 22B. As shown by FIG. 6, at least one of the joint connectors 240 joining lineal 22 to form frame 226 comprises a first head 242, a second head 244 and a neck 246 interconnecting heads 242 and 244. Head 242 forms a shoulder 248 adjacent to neck 246 and facing head 244. At the same time, head 244 forms a second shoulder 250 adjacent to neck 246 facing head 242.

In the example illustrated, head 242 has a polygonal shape adjacent to neck 246. In the example illustrated, head 242 has a triangular or arrow shaped head. Head 244 has a non-symmetrical shape. In the example illustrated, head 244 has a shape forming one or more alphanumeric symbols. In the example illustrated, head 244 has a shape forming a trademark or logo. As a result, head 244 serves a dual function of not only joining lineal 22 to form frame 226 but also marking frame 226 with a trademark or logo as well as providing the rear face of frame 226 with an attractive appearance. In the example illustrated, head 244 have the shape of the letters MG. In other implementations, head 244 may have other shapes forming other letters, other numbers, other symbols, other logos or trademarks or other configurations or designs.

As further shown by FIG. 6, lineals 22 include openings that receive joint connectors 240 such that joint connectors 240 connect and retain lineals 22 relative to one another along joints 28. In particular, lineal 22A comprises a head cavity 252 extending from the rear face 32 towards the front face 30 along an end of lineal 22A adjacent the to be formed joint 28. In the example illustrated, head cavity 252 has a shape corresponding to the shape of head 242, wherein head cavity 252 opens to form a neck opening 260 to edge 253 of lineal 22A for the reception of neck 246 of joint connector 240. Similar to lineal 22A, lineal 22B comprises a head cavity 254 extending from the rear face 32 towards the front face 30 along an end of lineal 22B adjacent the to be formed joint 28. In the example illustrated, head cavity 254 has a shape corresponding to the shape of head 242, wherein head cavity 254 opens to form a neck opening 264 to edge 255 of lineal 22B for the reception of neck 246 of joint connector 240.

In the example illustrated, head cavities 252, 254 each correspond in shape to heads 142 and 144, respectively. In some implementations, head cavities 252 or 254 may alternatively have shapes different from the exact shape of heads 242, 244 so long as such cavities 252, 254 receive heads 242, 244 and have inner surfaces that engage or contact the opposing shoulders of heads 242, 244 such that joint connector 244 still aligns and clamps the consecutive lineals 22 along joint 28. For example, in lieu of having a shape that substantially matches the shape of head 244 (such as where cavity 254 would also have the shape of MG), cavity 254 may alternatively comprise an oval, polygonal or other shaped cavity that receives the shape of head 244, but which does not have interior edges that contact each and every outer edge of head 244.

As with system 20, with system 220, edges 253 and 255 are positioned adjacent to one another to form joint 28. Joint connector 240 is then inserted into the adjacent head cavities 252 and 254. In particular, head 242 is inserted into cavity 252 while head 244 is inserted into cavity 254. The neck 246 interconnecting heads 242 and 244 extends through the adjacent neck openings 262, 264 of cavities 252 and 254, respectively. Because heads 242 and 244, and in particular shoulders 248, 250, are spaced from one another by a distance equal to or slightly less than the spacing of the interior edges of their corresponding cavities 252 and 254, joint connector 240 automatically tightens or clamps joint 28. The degree of clamping may be varied by varying the relative positioning of cavities 252, 254 to vary the spacing of those interior surfaces of cavities 252, 254 that face in opposite directions and which contact shoulders 248, 250. Such tightening is achieved without the use of tools and allows joint frame 26 to be assembled by hand or with a hammer. In addition to providing a clamping force, the interaction of shoulders 248, 250 with the interior edges of cavities 252 and 254 also provides an alignment function. As a result, lineals 22 are more consistently and reliably aligned in position with respect to one another.

Figure 7:
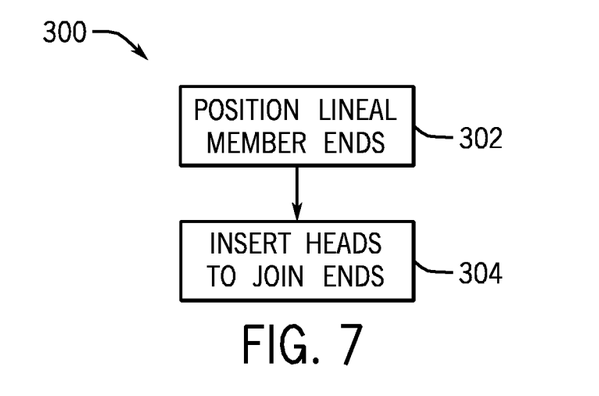
FIG. 7 is a flow diagram of an example method for assembling a frame using the lineal connection system of FIGS. 1-4, of FIG. 5 or FIG. 6.

FIG. 7 is a flow diagram illustrating an example method 300 for assembling a frame, such as frame 26, 126, or 226. As indicated by step 302, ends of lineals 22 are positioned against one another. In particular, the edges (edges 53, 55, 153, 155 or 253, 255) are positioned against one another such that head cavities 52, 54, cavities 152, 154 or cavities 252, 254 and their associated necks are sufficiently aligned with one another to receive joint connectors 40, 140, 240.

As indicated by step 304, joint connector 40, 140, 240 is inserted into substantially aligned cavities to join and clamp together lineals 22. As noted above, when joint connectors 40, 140, 240 are inserted into the corresponding cavities, heads 42, 142, 244 are inserted into cavities 52, 152, 252 while heads 44, 144, 244 are inserted into cavities 54, 154, 254, respectively. The necks 46, 146, 246 interconnecting the heads extend through the adjacent neck openings of the cavities.

Figure 8:
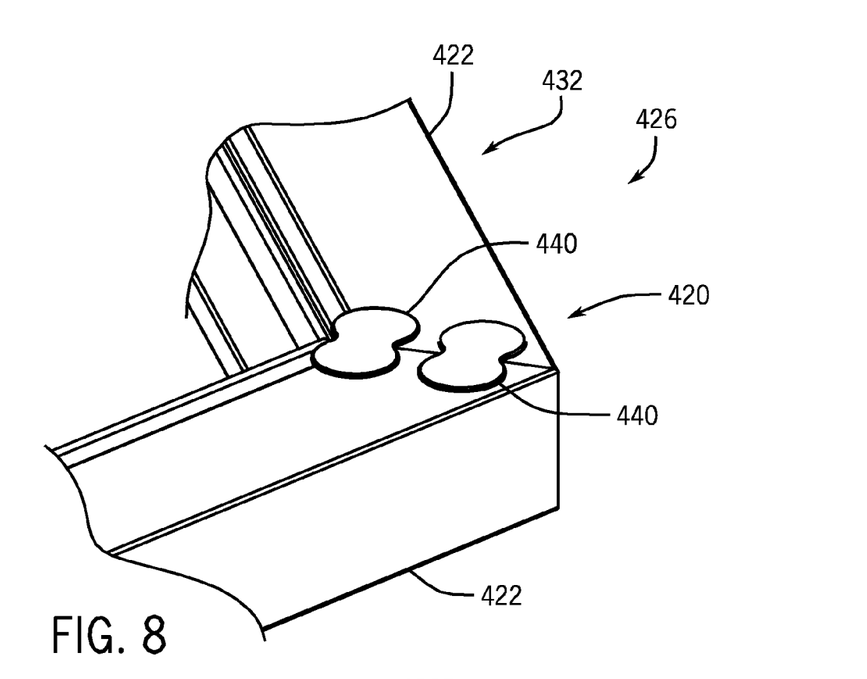
FIG. 8 is an enlarged fragmentary rear perspective view of an example frame assembled using another example of the lineal connection system of FIG. 1.
Figure 9:
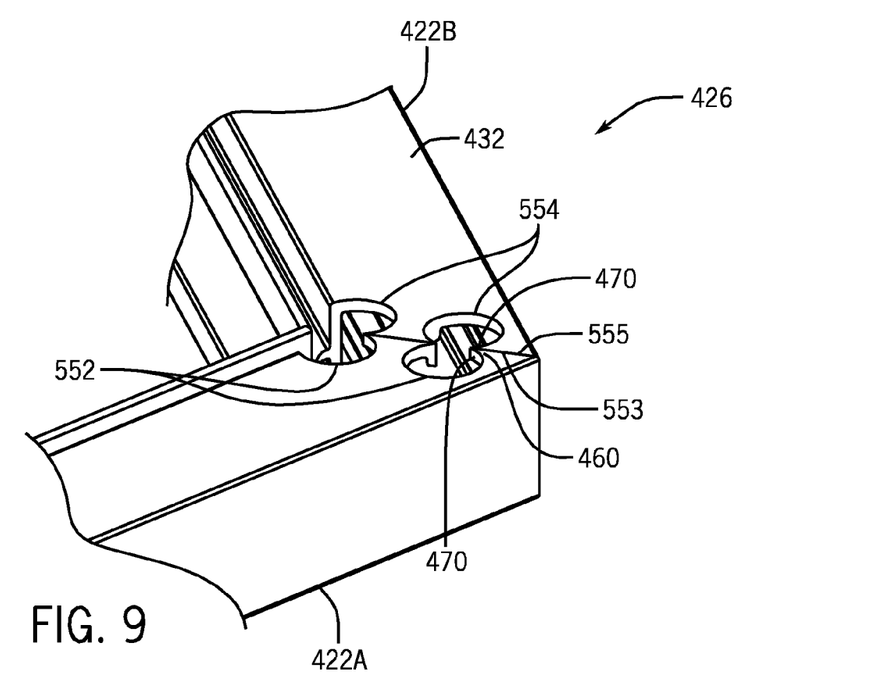
FIG. 9 is an enlarged fragmentary rear perspective view of the example frame of FIG. 8 omitting joint connectors.
Figure 10:
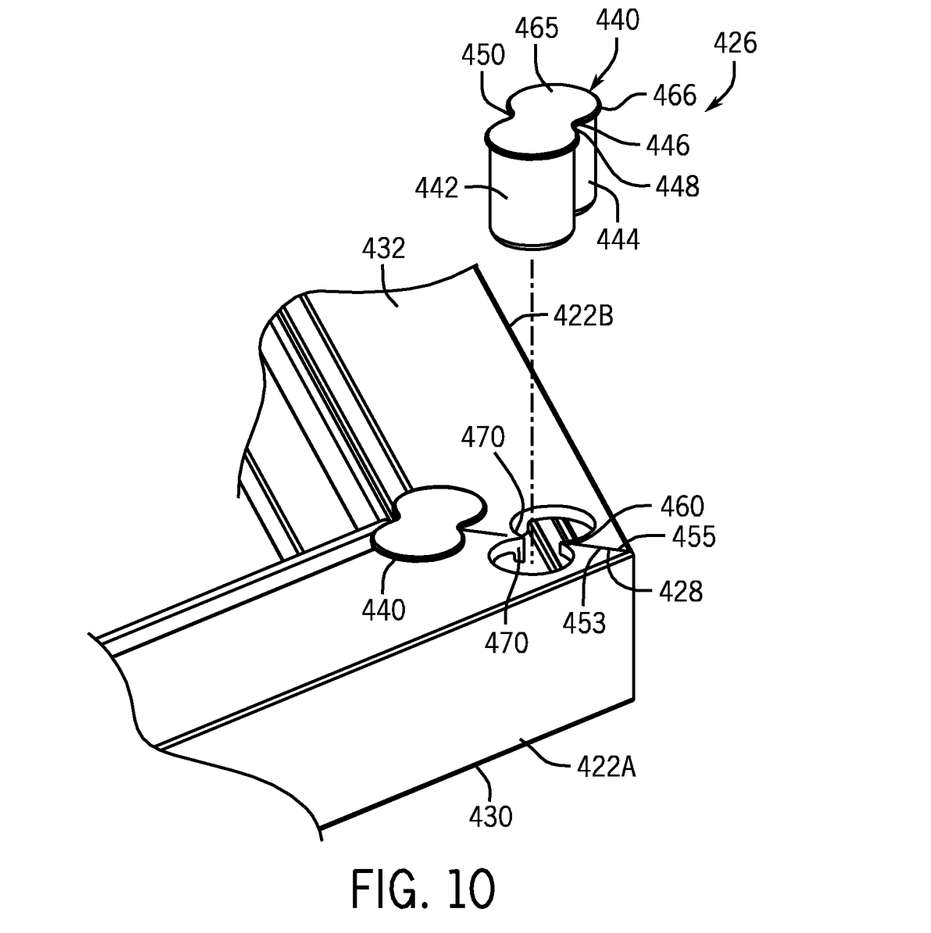
FIG. 10 is an enlarged fragmentary rear perspective view of the frame of FIG. 8 illustrating removal of one of the joint connectors of the lineal connection system.

FIGS. 8-10 illustrate frame 426, another implementation of frame 26. FIG. 8 illustrates a rear face 432 of frame 426, wherein the front face 430 of frame 426 is identical to the front face 30 of frame 26 shown in FIGS. 1 and 3. Frame 426 is similar to frame 26 except that frame 426 utilizes lineal connection system 420 to join lineals 422. Lineal connection system 420 is similar to lineal connection system 20 except that lineal connection system 120 utilizes joint connectors 440 in lieu of the joint connectors 40 and has correspondingly shaped cavities in lineals 422. As shown by FIG. 10, each joint connector 440 comprises a first head 442, a second head 444 and a neck 446 interconnecting heads 442 and 444. Head 442 forms a shoulder 448 adjacent to neck 446 and facing head 444. At the same time, head 444 forms a second shoulder 450 adjacent to neck 446 facing head 442. In the example illustrated, heads 442 and 440 are cylindrical in shape.

As further shown by FIG. 10, each of heads 442, 444 and interconnecting neck 446 of joint connector 440 further comprises a cap 465 having a flared rim 466 projecting outwardly and beyond the outer perimeter of the generally cylindrical body of heads 442, 444 and the side of neck 446. Flared rim 466 extends outwardly extends from connector 440 in overlies or overlaps the rear face 432 of lineals 422. Flared rim 446 facilitates optimum positioning of connector 440 within lineals 422A, 422B. At the same time, flared rim 446 overlaps the edges or sides of the openings in lineals 422 to conceal such edges for an enhanced appearance. In the example illustrated, flared rim 466 as an outer profile that matches the or profile of connector 444. In other implementations, flared rim 466 may have a shape or other profile that does not match the underlying shape or profile of connector 440.

In some implementations, flared rim 466 in combination with the top of connector 440 may form an alphanumeric symbol, shape, logo or design. For example, although the shape of connector 440 that is physically received within lineals 422 has a first shape, cap 465 and its rim 466 may have a second distinct shape. In the example illustrated, the body of connector 440 has a general 8 shape. However, cap 465 may have the shape of one or more alphanumeric symbols (such as MG), a logo or other design. With such an implementation, cap 465 not only covers the edges of the openings in lineals 422, but also conceals the shapes of such openings and provides visually appealing design or trademark marking or product differentiation.

As shown by FIGS. 9 and 10, lineals 422 include openings that receive joint connectors 440 such that joint connectors 440 connect and retain lineals 422 relative to one another along joints 428. In particular, lineal 422A comprises a head cavity 452 extending from the rear face 432 towards the front face 430 along an end of lineal 422A adjacent the to be formed joint 428. In the example illustrated, head cavity 452 has a shape corresponding to the shape of head 442, wherein head cavity 452 opens to form a neck opening 460 to edge 453 of lineal 422A for the reception of neck 446 of joint connector 440. Similar to lineal 422A, lineal 422B comprises a head cavity 454 extending from the rear face 432 towards the front face 430 along an end of lineal 422B adjacent the to be formed joint 428. In the example illustrated, head cavity 454 has a shape corresponding to the shape of head 442, wherein head cavity 454 opens to form a neck opening 464 to edge 455 of lineal 422B for the reception of neck 446 of joint connector 440. In the example illustrated, head cavities 452, 154 are each cylindrical, corresponding in shape to heads 442 and 444, respectively.

As with system 20, with system 420, edges 453 and 455 are positioned adjacent to one another to form joint 428. Joint connector 440 is then inserted into the adjacent head cavities 452 and 454. In particular, head 442 is inserted into cavity 452 while head 444 is inserted into cavity 454. The neck 446 interconnecting heads 442 and 444 extends through the adjacent neck openings 462, 464 of cavities 452 and 454, respectively. Because heads 442 and 444, and in particular shoulders 448, 450, are spaced from one another by a distance equal to or slightly less than the spacing of the interior edges of their corresponding cavities 452 and 454, joint connector 440 automatically tightens or clamps joint 428. The degree of clamping may be varied by varying the relative positioning of cavities 452, 454 to vary the spacing of those interior surfaces 470 of cavities 452, 454 that face in opposite directions and which contact shoulders 448, 450. Such tightening is achieved without the use of tools and allows joint frame 26 to be assembled by hand or with a hammer. In addition to providing a clamping force, the interaction of shoulders 448, 450 with the interior edges 470 of cavities 452 and 454 also provides an alignment function. As a result, lineals 422 are more consistently and reliably aligned in position with respect to one another.

Figure 13:
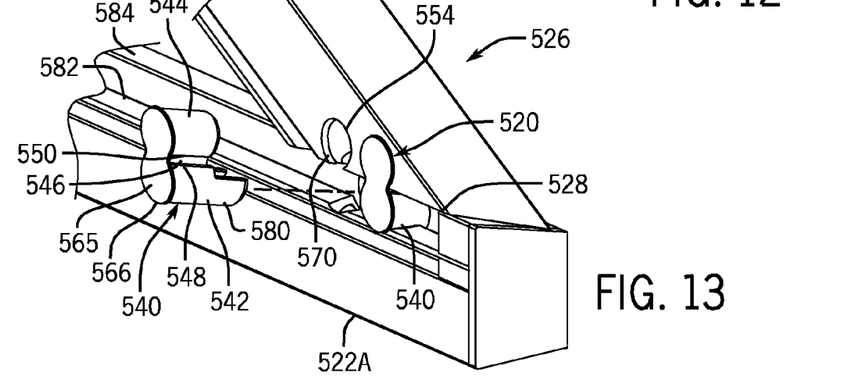
FIG. 13 is an enlarged rear perspective view of the portion of the frame of FIG. 12 illustrating removal of one joint connector of the example lineal connection system.
Figure 14:
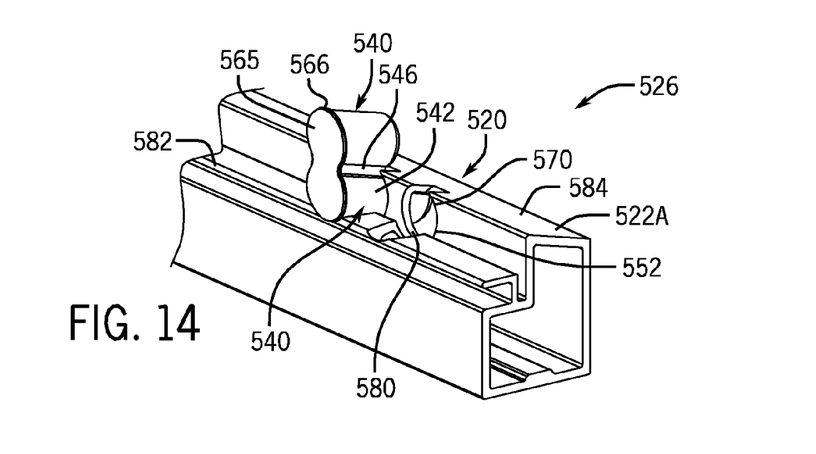
FIG. 14 is an enlarged rear perspective fragmentary view of a portion of the frame of FIG. 13 illustrating removal of one joint connector from one lineal.

FIGS. 11-14 illustrate frame 526, another implementation of frame 26. FIG. 8 illustrates a rear face 532 of frame 126, wherein the front face 530 of frame 526 is identical to the front face 30 of frame 26 shown in FIGS. 1 and 3. Frame 526 is similar to frame 26 except that frame 526 utilizes lineal connection system 520 to join lineals 522 along a butt joint 528. Lineal connection system 520 is similar to lineal connection system 20 except that lineal connection system 520 utilizes joint connectors 540 in lieu of the joint connectors 40 and has correspondingly shaped cavities in lineals 522. As shown by FIGS. 13 and 14, each joint connector 540 comprises a first head 542, a second head 544 and a neck 546 interconnecting heads 542 and 544.

As further shown by FIG. 13, head 542 additionally comprises a head extension 580. Head extension 580 extends from the main body of head 542, providing head 542 with an additional axial length. As shown by FIG. 14, this additional axial length provided to head 542 by extension 580 facilitates reliable engagement of head 542 with lineal 522A. In particular, head extension 580 allows head 542 to extend across the cut out, stepped recessed portion 582 of lineal 522A and to extend into the frontward most panel 584 of lineal 522A. In the example illustrated, extension 580 has a partial cylindrical shape, allowing joint connector 542 be a properly positioned between and with respect to lineals 522A and 522B. In other implementations, heads 542, 544 may have other configurations to accommodate the particular configurations of lineals 522. Extension 580 of Head 542 forms a shoulder 548 adjacent to neck 546 and facing head 544. At the same time, head 544 forms a second shoulder 550 adjacent to neck 546 facing head 542.

As with heads heads 442, 444 and interconnecting neck 446 of joint connector 440, each of heads 552, 544 and interconnecting neck 546 of joint connector 540 further comprises cap 465 having flared rim 466 projecting outwardly and beyond the outer perimeter of the generally cylindrical body of heads 442, 444 and the side of neck 446, discussed above.

Figure 11:
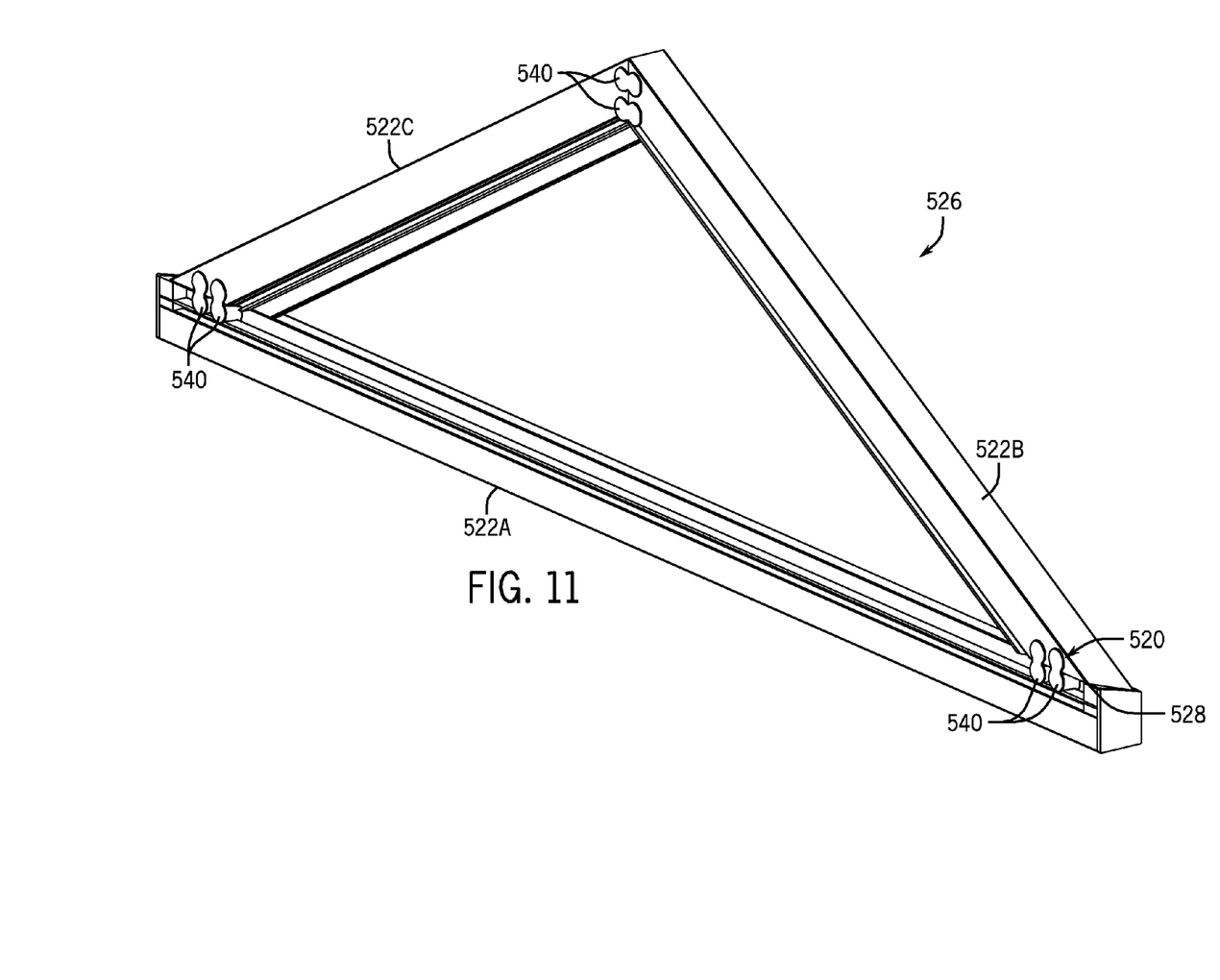
FIG. 11 is a rear perspective view of another example frame using another example of the lineal connection system of FIG. 1.
Figure 12:
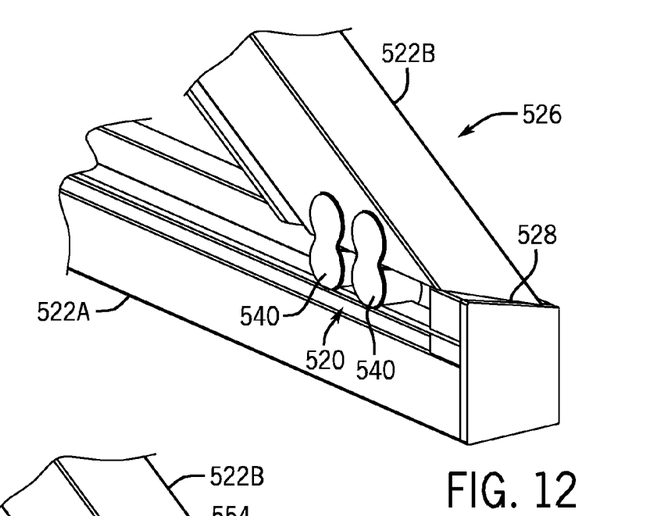
FIG. 12 is an enlarged rear perspective view of a portion of the frame of FIG. 11.

As shown by FIGS. 11 and 14, lineals 422 include openings that receive joint connectors 540 such that joint connectors 540 connect and retain lineals 522 relative to one another along joints 528. In particular, lineal 522A comprises a head cavity 552 extending from the rear face 532 towards the front face 530 along an end of lineal 522A adjacent the to be formed joint 528. In the example illustrated, head cavity 552 has a shape corresponding to the shape of head 542, wherein head cavity 552 opens to form a neck opening 560 to edge 553 of lineal 522A for the reception of neck 546 of joint connector 540. Similar to lineal 522A, lineal 522B comprises a head cavity 554 extending from the rear face 532 towards the front face 530 along an end of lineal 522B adjacent the to be formed joint 528. In the example illustrated, head cavity 554 has a shape corresponding to the shape of head 542, wherein head cavity 554 opens to form a neck opening 564 to edge 555 of lineal 522B for the reception of neck 546 of joint connector 540. In the example illustrated, head cavities 552, 554 are each cylindrical, corresponding in shape to heads 542 and 544, respectively.

As with system 20, with system 520, edges 553 and 455 are positioned adjacent to one another to form joint 528. Joint connector 540 is then inserted into the adjacent head cavities 552 and 554. In particular, extension 580 of head 542 is inserted into cavity 552 while head 544 is inserted into cavity 554. The neck 546 interconnecting heads 542 and 544 extends through the adjacent neck openings 562, 564 of cavities 552 and 554, respectively. Because heads 542 and 544, and in particular shoulders 548, 550, are spaced from one another by a distance equal to or slightly less than the spacing of the interior edges of their corresponding cavities 552 and 554, joint connector 540 automatically tightens or clamps joint 528. The degree of clamping may be varied by varying the relative positioning of cavities 552, 554 to vary the spacing of those interior surfaces 570 of cavities 552, 554 that face in opposite directions and which contact shoulders 548, 550. Such tightening is achieved without the use of tools and allows frame 526 to be assembled by hand or with a hammer. In addition to providing a clamping force, the interaction of shoulders 548, 550 with the interior edges 570 of cavities 552 and 554 also provides an alignment function. As a result, lineal connection system 520 more consistently and reliably aligns and positions lineals 522 with respect to one another.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A window frame having a rear face and a front face, the window frame comprising:
    a first member including a cavity extending from an opening in a rear face of the first frame member toward a front face of the first frame member;
    a second frame member including a cavity extending from an opening in a rear face of the second frame member toward a front face of the second frame member;
    wherein the opening in the first frame member and the opening in the second frame member are not in the same plane; and
    a first neck opening through a side of the first frame head cavity; and
    at least one frame joint connector connecting the first frame member and the second frame member, the at least one frame joint connector comprising;
    a first head having a first axial length;
    a second head having a second axial length greater than the first axial length; and
    a neck interconnecting the first head and the second head, wherein the first head forms a first shoulder adjacent the neck facing the second head, wherein the second head forms a second shoulder adjacent the neck facing the first head, wherein the first head is within the first head cavity, wherein the second head is within the second head cavity and wherein the neck extends through the first neck opening and the second neck opening to connect the first frame member and the second frame member.

2. The apparatus of claim 1 further comprising:
a frame having a front face and a rear face, the frame comprising:
a first frame member comprising:
a first head cavity extending from the rear face toward the front face; and
a first neck opening through a side of the first head cavity;
a second frame member comprising:
a second head cavity extending from the rear face toward the front face; and
a second neck opening through a side of the second head cavity;
wherein the first head of the frame joint connector is within the first head cavity, wherein the second head of the frame joint connector is within the second head cavity and wherein the neck extends through the first neck opening and the second neck opening to connect the first frame member and the second frame member;
wherein the first head cavity has a first opening in a first rear surface and wherein the second head cavity has a second opening in a second rear surface offset from the first rear surface in a direction towards the front face of the frame, the first rear surface and the second rear surface being in different planes.

3. The apparatus of claim 2, wherein the first head has a first axial length and wherein the second head has a second axial length greater than the first axial length.

4. The apparatus of claim 2, wherein the first head cavity has a first opening in a first rear surface and wherein the second head cavity has a second opening in a second rear surface extending in a same plane as the first rear surface.

5. The apparatus of claim 2, wherein a majority the first head cavity is cylindrical and wherein a majority of the second head cavity is cylindrical.

6. The apparatus of claim 5, wherein a majority the first head is cylindrical and wherein a majority the second head is cylindrical.

7. The apparatus of claim 2, wherein the first head includes a flared rim overlying an edge of the first head cavity.

8. The apparatus of claim 2, wherein the first head cavity and the second head cavity terminate prior to the front face of the frame.

9. The window frame of claim 1, wherein a majority the first head cavity is cylindrical, wherein a majority of the second head cavity is cylindrical, wherein a majority the first head is cylindrical and wherein a majority the second head is cylindrical.

10. The window frame of claim 1, wherein the first head includes a flared rim overlying an edge of the first head cavity.

11. The window frame of claim 1, wherein at least one of the first head and the second head form one of an alphanumeric symbol and a logo.

12. The window frame of claim 1, wherein the distance between the first shoulder and the second shoulder is slightly less than the distance between a corresponding interior surface of the first cavity and an interior surface of the second cavity.

13. The window frame of claim 1, wherein the first head cavity and the second head cavity terminate prior to the front face of the frame.

* * * * *